US010023787B2

(12) United States Patent
Benoit et al.

(10) Patent No.: US 10,023,787 B2
(45) Date of Patent: Jul. 17, 2018

(54) SURFACTANT SELECTION METHODS FOR FLUID RECOVERY IN SUBTERRANEAN FORMATIONS

(71) Applicant: Halliburton Energy Services, Inc., Houston, TX (US)

(72) Inventors: Denise Nicole Benoit, Houston, TX (US); Chandra Sekhar Palla-Venkata, Conroe, TX (US); Jody Marie Burks, Spring, TX (US); Nathan Carl Schultheiss, Kingwood, TX (US); Ali Alwattari, The Woodlands, TX (US); David Loveless, Houston, TX (US); James William Ogle, Spring, TX (US); Thomas Welton, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/522,940

(22) PCT Filed: Dec. 4, 2014

(86) PCT No.: PCT/US2014/068583
§ 371 (c)(1),
(2) Date: Apr. 28, 2017

(87) PCT Pub. No.: WO2016/089408
PCT Pub. Date: Jun. 9, 2016

(65) Prior Publication Data
US 2017/0327731 A1 Nov. 16, 2017

(51) Int. Cl.
*C09K 8/584* (2006.01)
*C09K 8/68* (2006.01)
(Continued)

(52) U.S. Cl.
CPC .............. *C09K 8/68* (2013.01); *C09K 8/52* (2013.01); *C09K 8/584* (2013.01); *C09K 8/602* (2013.01); *C09K 8/86* (2013.01)

(58) Field of Classification Search
None
See application file for complete search history.

(56) References Cited

U.S. PATENT DOCUMENTS

| 4,722,396 A | 2/1988 | Balzer |
| 9,422,470 B2 | 8/2016 | Xu et al. |

(Continued)

OTHER PUBLICATIONS

Halliburton Energy Services, Inc., "Rock Perm Service" Brochure, 2014, 2 pages.

(Continued)

*Primary Examiner* — Angela M DiTrani
*Assistant Examiner* — Andrew Sue-Ako
(74) *Attorney, Agent, or Firm* — Craig Roddy; Baker Botts L.L.P.

(57) ABSTRACT

Methods for selecting a surfactant for treating a subterranean formation based on the performance of the surfactant and the characteristics of the subterranean formation and the treatment fluids that may be used to treat that formation are provided. In one embodiment, the method may comprise providing a treatment fluid, formation materials, hydrocarbon, and a plurality of surfactants, wherein the hydrocarbon is acquired from a subterranean formation; selecting at least two surfactants from the plurality of surfactants by determining whether each of the plurality of surfactants separates a mixture of the treatment fluid and the hydrocarbon; and selecting at least one surfactant from the at least two surfactants by determining whether the hydrocarbon displaces the treatment fluid from the formation materials in the presence of each of the at least two surfactants.

20 Claims, 5 Drawing Sheets

(51) Int. Cl.
*C09K 8/60* (2006.01)
*C09K 8/86* (2006.01)
*C09K 8/52* (2006.01)

(56) References Cited

U.S. PATENT DOCUMENTS

| | | |
|---|---|---|
| 2002/0023752 A1 | 2/2002 | Qu et al. |
| 2011/0083847 A1* | 4/2011 | Bittner .................. C09K 8/584 166/270.1 |
| 2011/0161010 A1* | 6/2011 | Rickman ................. E21B 43/16 702/11 |
| 2012/0152548 A1 | 6/2012 | Hinkel et al. |
| 2012/0241149 A1 | 9/2012 | Chen et al. |
| 2013/0067999 A1 | 3/2013 | Xu et al. |
| 2016/0290909 A1 | 10/2016 | Burks et al. |

OTHER PUBLICATIONS

Xu, Liang, and Qiang Fu. "Ensuring better well stimulation in unconventional oil and gas formations by optimizing surfactant additives." SPE Western Regional Meeting. Society of Petroleum Engineers, 2012.

International Search Report and Written Opinion issued in related PCT Application No. PCT/US2014/068583 dated Aug. 3, 2015, 9 pages.

International Preliminary Report on Patentability issued in related Application No. PCT/US2014/068583, dated Jun. 15, 2017 (6 pages).

* cited by examiner

SURFACTANT SELECTION METHODS FOR FLUID RECOVERY IN SUBTERRANEAN FORMATIONS

CROSS-REFERENCE TO RELATED APPLICATION

The present application is a U.S. National Stage Application of International Application No. PCT/US2014/068583 filed Dec. 4, 2014, which is incorporated herein by reference in its entirety for all purposes.

BACKGROUND

The present disclosure relates to methods for selecting a surfactant for treating a subterranean formation.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

Surfactants are widely used in treatment fluids for drilling operations and other well treatment operations, including hydraulic fracturing and acidizing (both fracture acidizing and matrix acidizing) treatment operations. Surfactants may also be used to enhance or improve treatment fluid and hydrocarbon recovery operations.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods for selecting a surfactant for treating a subterranean formation. More particularly, the present disclosure relates to methods for selecting a surfactant for treating a subterranean formation based on the performance of the surfactant and the characteristics of the subterranean formation and the treatment fluids that may be used to treat that formation.

Surfactants are an important component in treatment fluids for ensuring higher productivity from unconventional hydrocarbon formations. The efficacy of surfactants chosen for a subterranean treatment or operation depends on a number of factors, including formation characteristics, hydrocarbon compositions, and components of the treatment fluid. Even minor changes in hydrocarbon, formation water, or formation rock composition from reservoir to reservoir can have a major impact on the performance of a surfactant.

Surfactants may affect many variables in subterranean treatments and operations, such as interfacial/surface tension, wettability, compatibility with other additives (such as other additives used in acidizing treatments), and emulsification tendency. The present disclosure provides methods for selecting an optimum surfactant or blend of surfactants for treating a particular subterranean formation based on the performance of the surfactant or blend of surfactants relative to the performance of other surfactants while taking into consideration the characteristics of a particular subterranean formation, including the formation materials and the hydrocarbon, and the characteristics of the treatment fluid that may be used to treat the subterranean formation. The optimum surfactant or blend of surfactants for a particular subterranean formation may vary based on the type of surfactant and the characteristics of the subterranean formation or the treatment fluid that may be used to treat the subterranean formation.

Among many potential advantages, only some of which are alluded to herein, the methods of the present disclosure may allow for enhanced hydrocarbon and treatment fluid recovery from a subterranean formation by enabling the selection of a surfactant based on the performance of the surfactant with formation materials and hydrocarbon from the particular subterranean formation to be treated and treatment fluids that may be used to treat that formation. The methods of the present disclosure may also allow for quick, low-cost, and accurate surfactant selection for a particular subterranean formation by using minimal equipment to evaluate the performance of the surfactants based on certain criteria including, but not limited to, percent separation of a mixture comprising treatment fluid and hydrocarbon, separation time of a mixture comprising treatment fluid and hydrocarbon, the effect the surfactant has on hydrocarbon recovery time, and the compatibility of the surfactants with treatment fluids that may be used to treat a subterranean formation. Because minimal equipment is required to perform the methods of the present disclosure, the methods of the present disclosure may be performed at any location, including, but not limited to, field labs and production well sites. Moreover, the methods of the present disclosure may allow for a large number of potential surfactants to be quickly evaluated to determined one or more surfactants suited for a particular subterranean formation or application.

As used herein, the term "percent separation" refers to the percent of a mixture comprising treatment fluid and hydrocarbon that has separated into distinct phases (i.e., treatment fluid and hydrocarbon). As used herein, the term "separation time" refers to the amount of time it takes for a mixture comprising treatment fluid and hydrocarbon to separate into distinct phases.

As used herein, the term "formation materials" refers to any solid or liquid material that may be found in a subterranean formation including, but not limited to, drilled core samples from rock formations (e.g., calcites, dolomites, limestone, shale), cuttings retrieved while the formation is being drilled, rock samples representative of formation mineralogy, samples of rock harvested from outcrops, unconsolidated sands, quartz, carbonates, clays, limestones, proppant, formation hydrocarbon, formation water, and the like. In certain embodiments, the formation materials used in accordance with the methods of the present disclosure may be acquired from a subterranean formation to be treated with the surfactant selected in accordance with the methods of the present disclosure. In certain embodiments, the formation materials used in accordance with the methods of the present disclosure may be representative of materials that may be found in a subterranean formation to be treated with the selected surfactant. In those embodiments, the formation materials used in accordance with the methods of the present disclosure may be such that they are not actually acquired from the subterranean formation to be treated, but may comprise components similar to formation materials that may be acquired from the subterranean formation. Generally, the formation materials used in accordance with the present disclosure are permeable. The permeability of the formation materials may vary with particle size of the formation materials. In certain embodiments, the formation materials used in accordance with the present disclosure may have a particle size of about 100 mesh.

As used herein, the term "hydrocarbon" refers to a naturally occurring organic compound that includes hydrogen and carbon. In certain embodiments, the hydrocarbon may be acquired from a subterranean formation to be treated with the surfactant selected in accordance with the methods of the present disclosure. In certain embodiments, the hydrocarbon used in accordance with the methods of the present disclosure may be processed or treated after being acquired from a subterranean formation.

Figure 1:
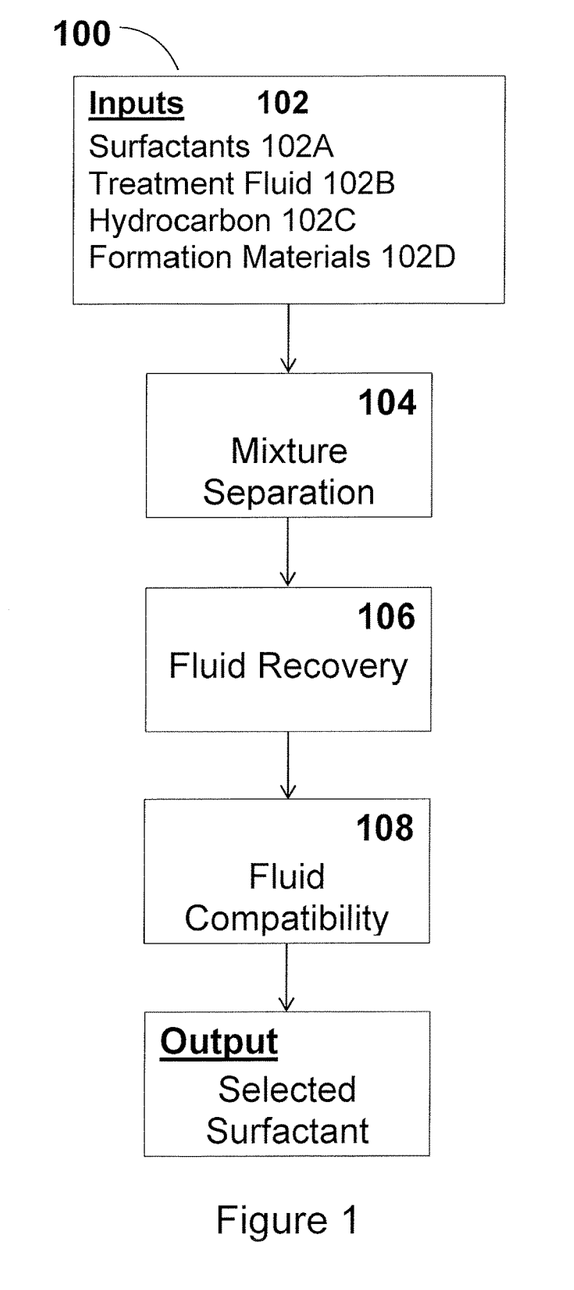
FIG. 1 is a diagram illustrating a workflow that may be used to select a surfactant based on the performance of the surfactant with formation materials and hydrocarbon from the formation and treatment fluids that may be used to treat the formation, according to one embodiment of the present disclosure.

The methods of the present disclosure may be used to select a surfactant based on the ability of the surfactant to cause mixture separation, the effect of the surfactant on fluid recovery, and the compatibility of the surfactant with fluids that may be used to treat a subterranean formation. FIG. 1 depicts a workflow 100 that may be used to select a surfactant based on the performance of the surfactant with formation materials and hydrocarbon from a subterranean formation and treatment fluids that may be used to treat the formation, according to one embodiment of the present disclosure. The use of arrows in FIG. 1 is not meant to imply any particular order in which the methods of the present disclosure must be performed. Referring to FIG. 1, different criteria may be considered in the performance of workflow 100. Such criteria include, for example, the characteristics of treatment fluid 102B, hydrocarbon 102C, and formation materials 102D.

According to FIG. 1, in certain embodiments, workflow 100 begins with multiple surfactants 102A, and workflow 100 may be performed to determine which of the multiple surfactants 102A may be used to treat a particular subterranean formation based on the characteristics of the subterranean formation and treatment fluids that may be used to treat the formation. The methods of the present disclosure may also be performed using multiple concentrations of the same surfactant. The characteristics of the subterranean formation that may be considered may include formation materials and hydrocarbon that may be present in the formation. The selection of the surfactant for a particular subterranean formation based on formation-specific characteristics may enhance recovery of hydrocarbon and treatment fluid from the subterranean formation.

The surfactants 102A that may be useful in accordance with the present disclosure may be any anionic surfactant, cationic surfactant, non-ionic surfactant, amphoteric surfactant, and any combinations thereof. Examples of suitable commercially available surfactants include, but are not limited to, OilPerm™ Fluid Mobility Modifiers (FMMs), OilPerm™ products, and RockOn® surfactants available from Halliburton Energy Services, Inc., Houston, Tex. In certain embodiments, surfactants that may be used in accordance with the methods of the present disclosure may be blended with a co-solvent (e.g., alcohols, water, or terpenes).

The treatment fluids 102B that may be useful in accordance with the present disclosure may be any treatment fluid known in the art. Treatment fluids that may be useful in accordance with the present disclosure include, but are not limited to, fracturing fluids, slick-water fracturing fluids, gravel packing fluids, pre-pad fluids, pad fluids, preflush fluids, afterflush fluids, acidic fluids, consolidation fluids, cementing fluids, weighted fluids, well bore clean-out fluids, conformance fluids, aqueous fluids (e.g., fresh water, salt water, brines, etc.), non-aqueous fluids (e.g., mineral oils, synthetic oils, esters, etc.), hydrocarbon-based fluids (e.g., kerosene, xylene, toluene, diesel, oils, etc.), foamed fluids (e.g., a liquid that comprises a gas), gels, emulsions, complex fluids, gases, and the like.

The treatment fluids used in accordance with the methods of the present disclosure optionally may comprise any number of additives. Examples of such additional additives include, but are not limited to, salts, surfactants, acids, proppant particulates, diverting agents, fluid loss control additives, tracking chemicals, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. Such additives may also affect the selection of a surfactant as such additives may have an effect on the characteristics of the treatment fluid.

In certain embodiments, the treatment fluid used in accordance with the methods of the present disclosure may be a treatment fluid that has already been introduced into a subterranean formation. For example, such treatment fluid may be a broken treatment fluid. As used herein, the term "broken treatment fluid" refers to a treatment fluid that was a cross-linked viscous gel which was degraded back into a thin fluid through use of temperature or a breaker. In certain embodiments, the treatment fluids used in accordance with the methods of the present disclosure may comprise produced water, connate water, and other fluids and naturally occurring components (e.g., bacteria) from a subterranean formation. In certain embodiments, the treatment fluids used in accordance with the methods of the present disclosure may be representative of treatment fluids that may be used in or recovered from the subterranean formation to be treated. In those embodiments, the treatment fluid used in accordance with the methods of the present disclosure may be one that is not actually used in or recovered from the subterranean formation to be treated, but it may comprise components similar to a treatment fluid that may be used in or recovered from the subterranean formation.

Referring back to FIG. 1, workflow 100 includes mixture separation 104. Mixture separation 104 refers to the ability of surfactants 102A to separate a mixture comprising treatment fluid 102B and hydrocarbon 102C. The time it takes for surfactants 102A to separate a mixture comprising treatment fluid 102B and hydrocarbon 102C into distinct phases and the percent separation of the mixture may be criteria considered when selecting a surfactant for use in a particular subterranean formation. In one embodiment, to determine percent separation and separation time, different mixtures, each containing treatment fluid 102B, hydrocarbon 102C, and one of the surfactants 102A, may be formed. In certain embodiments, the mixtures may contain a blend of two or more surfactants 102A. In certain embodiments, the mixtures may contain varying concentrations of the same surfactant.

The mixtures may be formed by any process. For example, in some embodiments, a high speed mixer may be used. In other embodiments, a low shear tumbling or hand shaking may be used. In certain embodiments, any degree of mixing may be sufficient to form a mixture. As used herein, the term "mixture" is not meant to imply any particular degree of homogeneity or heterogeneity. For example, in some embodiments, treatment fluid 102B and hydrocarbon 102C may separate immediately after the process of mixing is stopped. In other embodiments, one or more of the mixtures may form an emulsion of treatment fluid 102B and hydrocarbon 102C.

In certain embodiments, treatment fluid 102B may be combined with one or more surfactants 102A before hydrocarbon 102C is added to form one or more mixtures. In other embodiments, hydrocarbon 102C may be pretreated with one or more surfactants 102A before treatment fluid 102B is added to form one or more mixtures. In other embodiments, treatment fluid 102B and hydrocarbon 102C may be mixed to form one or more emulsions before different surfactants 102A are added to each of the emulsions.

In certain embodiments, the mixtures may be formed by mixing treatment fluid 102B and hydrocarbon 102C in a volume ratio of treatment fluid to hydrocarbon of about 25:75 to about 75:25. In some embodiments, the mixtures may be formed by mixing treatment fluid 102B and hydrocarbon 102C in a volume ratio of treatment fluid to hydrocarbon of about 50:50. In certain embodiments, one or more surfactants 102A may be present in each mixture in an amount of about 0.01% to about 1% by volume of treatment fluid 102B. In certain embodiments, one or more surfactants 102A may be present in each mixture from about 0.05% to about 0.3% by volume of treatment fluid 102B.

In certain embodiments, surfactants 102A may cause the mixtures to separate into distinct phases. In certain embodiments, percent separation of the mixtures, separation time of the mixtures, or both may be determined. In certain embodiments, percent separation may be determined by measuring the volume of each phase.

In certain embodiments, the mixtures may be heated to facilitate the separation of the mixtures before determining percent separation, separation time, or both. In certain embodiments, the mixtures may be heated to the bottom hole temperature of a subterranean formation into which the surfactant selected using workflow 100 may be introduced. In certain embodiments, the mixtures may be heated to a temperature of about 120° F. to about 200° F. before determining percent separation, separation time, or both.

In certain embodiments, each of the surfactants 102A used in mixture separation 104 may be ranked relative to the other surfactants based on percent separation, separation time, or both. In certain embodiments, a surfactant that separates a greater percent of the mixture as compared to another surfactant may be ranked higher than other surfactants. In certain embodiments, a surfactant that separates the mixture in less time as compared to another surfactant may be ranked higher than other surfactants.

In certain embodiments, one or more surfactants 102A may be selected based on the ability of the surfactant to separate the mixture comprising treatment fluid 102B and hydrocarbon 102C. In certain embodiments, one or more surfactants 102A may be selected based on percent separation, separation time, or both. In certain embodiments, one or more of surfactants 102A may be selected based on the ranking of surfactants 102A based on percent separation, separation time, or both. In certain embodiments, one or more surfactants 102A may be selected if a percent separation of about 10% to about 100% within 5 hours of forming the mixture is achieved. In certain embodiments, one or more surfactants 102A may be selected if a separation time of less than 5 hours is achieved. In certain embodiments, for example, one or more surfactants 102A may be selected if a separation percent of at least about 90% in a separation time of less than 20 minutes is achieved. In other embodiments, for example, one or more surfactants 102A may be selected if a separation time between about 1 hour and about 3 hours is achieved. In certain embodiments, one or more surfactants 102A selected in mixture separation 104 may be used in fluid recovery 106, in fluid compatibility 108, or in both.

Figure 2:
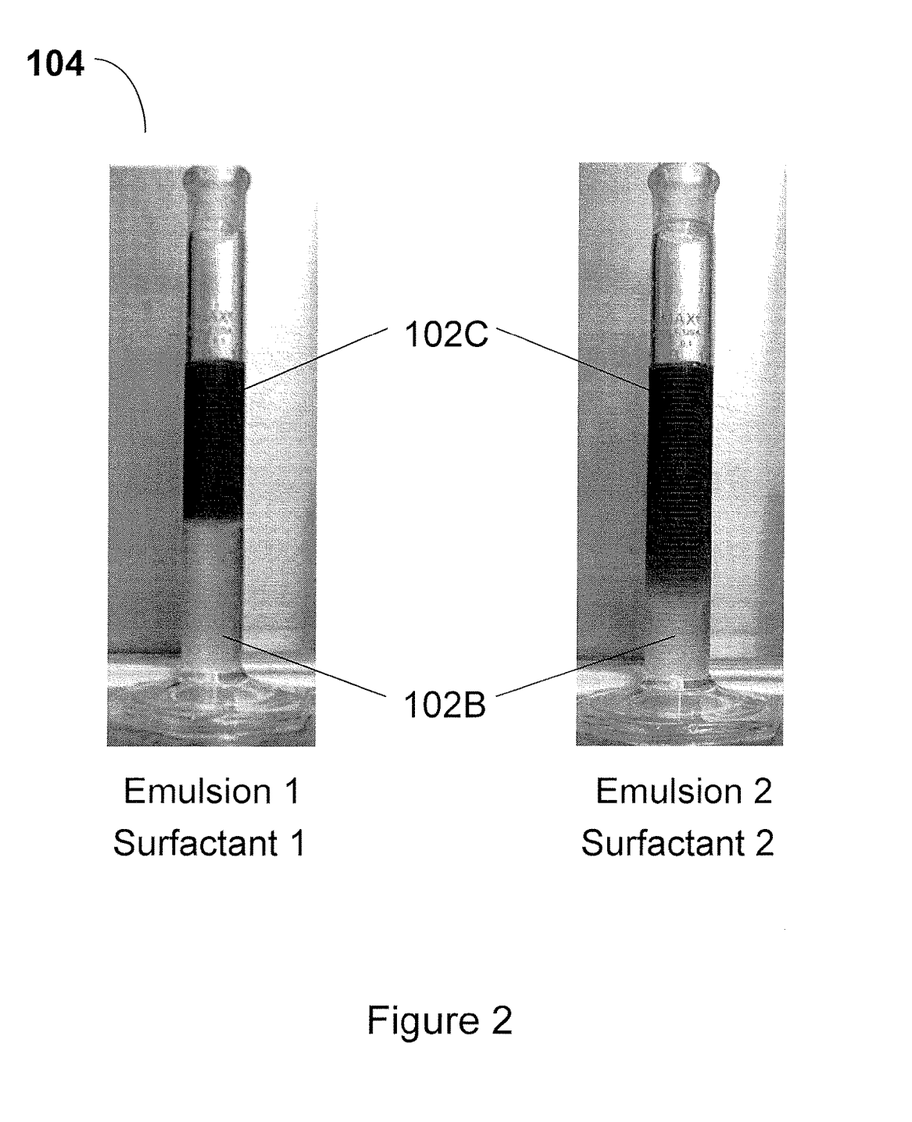
FIG. 2 is a photograph illustrating separation of two mixtures of a treatment fluid, hydrocarbon, and surfactants into distinct phases, according to one embodiment of the present disclosure. Each of the mixtures illustrated in FIG. 2 contains a different surfactant.

FIG. 2 illustrates one example of mixture separation 104 using two emulsions of treatment fluid 102B and hydrocarbon 102C, with each emulsion containing a different surfactant, according to one embodiment of the present disclosure. As illustrated in FIG. 2, the surfactants may separate the mixtures into a hydrocarbon 102C phase and a treatment fluid 102B phase. In certain embodiments, percent separation may be determined for each emulsion based on a visual inspection of the mixture. As shown in FIG. 2, a greater percent separation for one surfactant may be achieved as compared to another surfactant. In certain embodiments, one surfactant may be selected based on percent separation. Thus, as shown in FIG. 2, a greater percent separation was achieved by Surfactant 1 as compared to Surfactant 2.

Referring back to FIG. 1, workflow 100 also includes fluid recovery 106. Fluid recovery 106 refers to the ability of hydrocarbon 102C to flow through formation materials 102D and to displace treatment fluid 102B in the presence of surfactants 102A. The volume of treatment fluid 102B displaced from formation materials 102D and the time for hydrocarbon 102C to flow through formation materials 102D may be criteria considered when selecting a surfactant for a particular subterranean formation. In one embodiment, to determine the volume of treatment fluid 102B displaced from formation materials 102D and the time for hydrocarbon 102C to flow through formation materials 102D, treatment fluid 102B, hydrocarbon 102C, formation materials 102D, and one of the surfactants 102A may be added to multiple vessels. In certain embodiments, the vessels may contain a blend of two or more surfactants 102A. In certain embodiments, the vessels may contain varying concentrations of the same surfactant. In certain embodiments, the surfactants used in fluid recovery 106 may be surfactants that were selected in mixture separation 104.

In some embodiments, treatment fluid 102B, formation materials 102D, and surfactants 102A may be added to the vessels before hydrocarbon may be added to the vessels. In other embodiments, treatment fluid 102B, hydrocarbon 102C, and surfactants 102A may be added to the vessels before formation materials 102D may be added to the vessels. In other embodiments, formation materials 102D may be pretreated with treatment fluid 102B, hydrocarbon 102C, surfactants 102A, or combinations thereof before being added to the vessels. In certain embodiments, treatment fluid 102B may be combined with surfactants 102A before being added to the vessels.

The vessel used in accordance with the methods of the present disclosure may be any container that can hold materials. Vessels that may be suitable for use in accordance with the methods of the present disclosure may include, but are not limited to, columns, burets, test tubes, syringes, vacuum filtration apparatus, and the like. In certain embodiments, the vessel may have one or more openings on the top and on the bottom of the vessel.

The amount of treatment fluid 102B, hydrocarbon 102C, and formation materials 102D present in the vessel may vary depending upon the type of vessel used. In certain embodiments, formation materials 102D may be present in the vessel in an amount sufficient to permit the flow of hydrocarbons through the formation materials. This amount may be dependent upon the type of vessel. In certain embodiments, hydrocarbon 102C and formation materials 102D may be present in the vessel in a ratio of about 1 mL hydrocarbon to 10 grams formation materials to about 1 mL hydrocarbon to 1 gram formation materials. In certain embodiments, treatment fluid 102B and formation materials 102D may be present in the vessel in a ratio of about 1 mL treatment fluid to 10 grams formation materials to about 10 mL treatment fluid to 1 gram formation materials. In certain embodiments, treatment fluid 102B and hydrocarbon 102C may be present in the vessel in a volume ratio of treatment fluid to hydrocarbon of about 25:75 to about 75:25. In certain embodiments, one or more surfactants 102A may be present in each mixture in an amount of from about 0.01% to about 1% by volume of treatment fluid 102B. In certain embodiments, one or more surfactants 102A may be present in each mixture from about 0.05% to about 0.3% by volume of treatment fluid 102B.

In certain embodiments, hydrocarbon 102C may be allowed to flow through formation materials 102D and displace treatment fluid 102B from formation materials 102D. In certain embodiments, the flow of hydrocarbon 102C may be aided by the force of gravity. In certain embodiments, the volume or weight of treatment fluid 102B displaced from formation materials 102D, the time for hydrocarbon 102C to flow through formation materials 102D, or both may be determined.

In certain embodiments, surfactants 102A, treatment fluid 102B, hydrocarbon 102C, and/or formation materials 102D may be heated before being added to the vessels. In certain embodiments, surfactants 102A, treatment fluid 102B, hydrocarbon 102C, and/or formation materials 102D may be heated after being added to the vessels. In certain embodiments, surfactants 102A, treatment fluid 102B, hydrocarbon 102C, and/or formation materials 102D may be heated to the bottom hole temperature of a subterranean formation into which the surfactant selected using workflow 100 may be introduced. In certain embodiments, surfactants 102A, treatment fluid 102B, hydrocarbon 102C, and/or formation materials may be heated to a temperature of about 120° F. to about 200° F.

In certain embodiments, the surfactants 102A used in fluid recovery 106 may be ranked relative to the other surfactants based on the volume of treatment fluid 102B displaced from formation materials 102D, the time for hydrocarbon 102C to flow through formation materials 102D, or both. In certain embodiments, a surfactant that displaces a higher volume of treatment fluid 102B from formation materials 102D as compared to another surfactant may be ranked higher than other surfactants. In certain embodiments, a surfactant that allows the hydrocarbon 102C to flow through formation materials 102D in less time as compared to another surfactant may be ranked higher than other surfactants.

In certain embodiments, one or more of surfactants 102A may be selected based on the ability of hydrocarbon 102C to displace treatment fluid 102B from formation materials 102D in the presence of surfactants 102A. In certain embodiments, one or more surfactants 102A may be selected based on the volume of treatment fluid 102B displaced from formation materials 102D, the time for hydrocarbon 102C to flow through formation materials 102D, or both. In certain embodiments, one or more of surfactants 102A may be selected based on the ranking of the surfactants 102A based on the volume of treatment fluid 102B displaced from formation materials 102D, the time for hydrocarbon 102C to flow through formation materials 102D, or both.

In certain embodiments, one or more surfactants 102A may be selected if the volume of treatment fluid 102B displaced from formation materials 102D is from about 20% to about 100% of the volume of treatment fluid 102B mixed with formation materials 102D. In certain embodiments, one or more surfactants 102A may be selected if the time for hydrocarbon 102C to flow through formation materials 102D is less than about 120 minutes. In certain embodiments, one or more surfactants 102A may be selected if the volume of treatment fluid 102B displaced from formation materials 102D is from about 20% to about 100% of the volume of treatment fluid 102B mixed with formation materials 102D and the time for hydrocarbon 102C to flow through formation materials 102D is less than about 120 minutes. In certain embodiments, one or more surfactants 102A selected in fluid recovery 106 may be evaluated again using mixture separation 104, fluid recovery 106, fluid compatibility 108, or combinations thereof.

Figure 3:
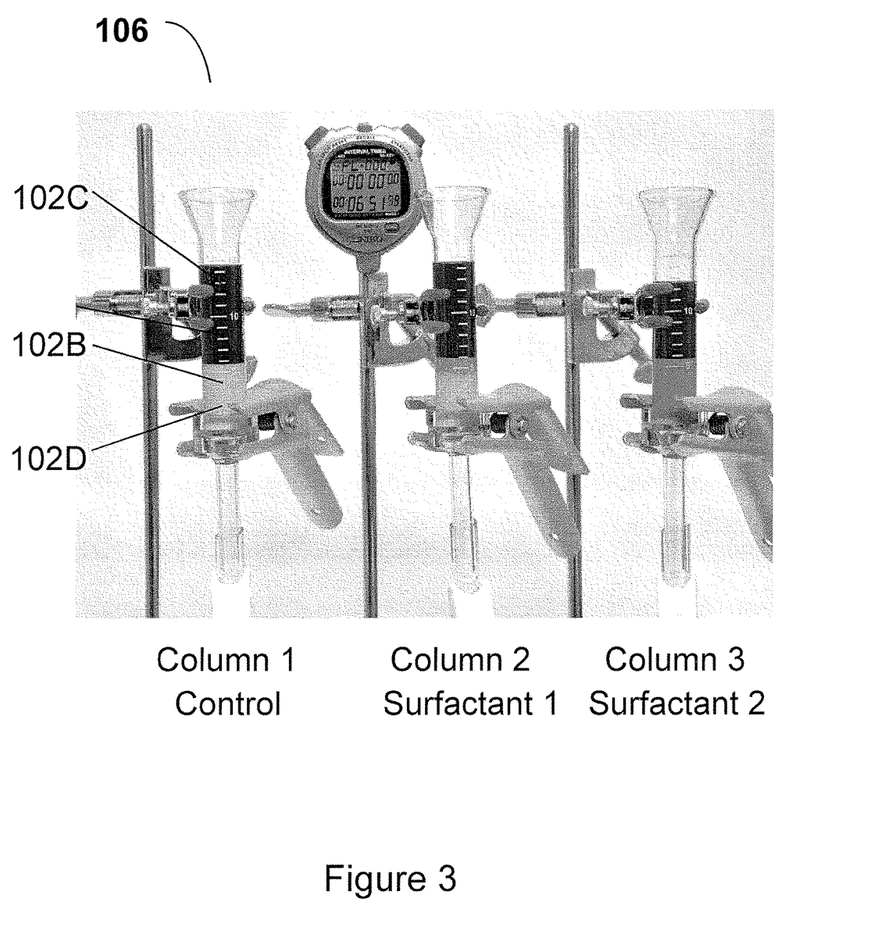
FIG. 3 is a photograph illustrating fluid recovery using three columns, according to one embodiment of the present disclosure. Column 1 contains a treatment fluid, formation materials, and no surfactant. Columns 2 and 3 each contain a treatment fluid, formation materials, and a different surfactant.

FIG. 3 illustrates fluid recovery 106 using two columns containing of treatment fluid 102B, formation materials 102D, and two different surfactants and one control column containing treatment fluid 102B and formation materials 102D, but no surfactant, according to one embodiment of the present disclosure. As shown in FIG. 3, in certain embodiments, hydrocarbon 102C may be added to each column simultaneously. In certain embodiments, hydrocarbon 102C may displace treatment fluid 102B from formation materials 102D and flow through formation materials 102D, as illustrated in FIG. 3. In certain embodiments, the volume of treatment fluid 102B displaced from formation materials 102D and the time for hydrocarbon 102C to flow through formation materials 102D may be determined. As depicted in FIG. 3, one surfactant may cause a greater volume of treatment fluid 102B to be displaced from formation materials 102D and may allow for hydrocarbon 102C to flow through formation materials 102D in less time than another surfactant. As illustrated in FIG. 3, Column 1, which contains no surfactant, shows minimal flow of hydrocarbon 102C and minimal displacement of treatment fluid 102B. Column 2, which contains Surfactant 1, shows slight flow of hydrocarbon 102C and faster displacement of treatment fluid 102B as compared to Column 1. Column 3, which contains Surfactant 2, shows hydrocarbon 102C already flowing through formation materials 102D and displacement of almost all of treatment fluid 102B in a faster time as compared to Columns 1 and 2. In certain embodiments, one surfactant may be selected based on the volume of treatment fluid 102B displaced from formation materials 102D and the time for hydrocarbon 102C to flow through formation materials 102D. Thus, according to the embodiment illustrated in FIG. 3, Surfactant 2 may be selected because Column 3 achieved the greatest displacement of treatment fluid 102B and the shortest amount time for hydrocarbon 102C to flow through formation materials 102D.

Referring back to FIG. 1, workflow 100 also includes fluid compatibility 108. Fluid compatibility 108 refers to the ability of surfactants 102A to interact with a subterranean formation (or its components) and/or a treatment fluid that may be used to treat the formation without adversely affecting the treatment fluid 102B. Whether a precipitate forms and whether the viscosity of treatment fluid 102B is changed may be criteria considered when selecting a surfactant for a particular subterranean formation. In one embodiment, to determine whether a precipitate forms and whether the viscosity of treatment fluid 102B is changed, treatment fluid 102B may be mixed with one or more surfactants 102A. In certain embodiments, fluid compatibility 108 may be performed by visually inspecting or testing the treatment fluid 102B used in the mixture separation 104, in fluid recovery 106, or in both, after mixing treatment fluid 102B with one or more surfactants 102A.

In certain embodiments, the viscosity profile of the treatment fluid 102B in the presence of one or more surfactants 102A as a function of temperature may be measured. In some embodiments, rheological studies can be performed to identify changes in viscosity of treatment fluid 102B due to the presence of one or more surfactants 102A. Whether a change in viscosity of treatment fluid 102B is desirable may depend on the type and application of the treatment fluid. For example, in one embodiment, a decrease in the viscosity of a fracturing fluid during the first 10 to 15 minutes following the addition of a surfactant may not be a desirable change in viscosity because that change in viscosity may decrease the ability of the fracturing fluid to transport the proppant into a subterranean formation. However, in other embodiments, a decrease in the viscosity of a fracturing fluid after several hours may be a desirable change in viscosity because that change in viscosity may be beneficial to allow for the recovery of the fracturing fluid from a subterranean formation.

In certain embodiments, it may be necessary to determine a concentration of one or more surfactants 102A that may be used to treat a particular subterranean formation. In certain embodiments, a concentration of one or more surfactants 102A may be selected based on the characteristics of a subterranean formation to be treated, the characteristics of hydrocarbon from the formation, and the characteristics of treatment fluids that may be used to treat the formation. In certain embodiments, to determine a concentration of one or more surfactants 102A, mixture separation 104, fluid recovery 106, fluid compatibility 108, and any combination thereof may be repeated using various concentrations of one or more surfactants 102A. The suitable concentrations for use in mixture separation 104, fluid recovery 106, and fluid compatibility 108 may vary depending on the type of surfactant. For example, in certain embodiments, the surfactants may be present at concentrations in the range of from about 0.01% to about 1% by volume of treatment fluid 102B for mixture separation 104, fluid recovery 106, and/or fluid compatibility 108.

In certain embodiments, one or more surfactants 102A selected in accordance with the methods of the present disclosure may be combined with a based fluid to form a well treatment fluid and may be introduced into a subterranean formation. In some embodiments, the well treatment fluid comprising one or more surfactants selected in accordance with the methods of the present disclosure may be introduced into a subterranean formation. In some embodiments, the well treatment fluid may be introduced into the formation using one or more pumps. In certain embodiments, the methods of the present disclosure may be performed at a production well site. In some embodiments, the methods of the present disclosure may be performed at a field lab.

The present disclosure, in some embodiments, provides methods for using the well treatment fluid comprising one or more surfactants selected in accordance with the methods of the present disclosure to carry out a variety of subterranean treatments, including but not limited to, hydraulic fracturing treatments, acidizing treatments, and drilling operations. In some embodiments, the treatment fluids of the present disclosure may be used in treating a portion of a subterranean formation, for example, in acidizing treatments such as matrix acidizing or fracture acidizing. In some embodiments, the well treatment fluid may be introduced into a well bore that penetrates a subterranean formation. In some embodiments, the well treatment fluid may be introduced at a pressure sufficient to create or enhance one or more fractures within the subterranean formation (e.g., hydraulic fracturing).

Certain embodiments of the methods disclosed herein may directly or indirectly affect one or more components or pieces of equipment associated with the preparation, delivery, recapture, recycling, reuse, and/or disposal of the disclosed well treatment fluids comprising one or more surfactants selected in accordance with the methods of the present disclosure. For example, the disclosed methods may directly or indirectly affect one or more components or pieces of equipment associated with an exemplary fracturing system. In certain instances, such fracturing systems include a fracturing fluid producing apparatus, a fluid source, a proppant source, and a pump and blender system, and resides at the surface at a well site where a well is located that penetrates a portion of a subterranean formation bearing fluids to be produced. In certain instances, the fracturing fluid producing apparatus combines a gel pre-cursor with fluid (e.g., liquid or substantially liquid) from fluid source, to produce a hydrated fracturing fluid that is used to fracture the formation. The hydrated fracturing fluid can be a fluid for ready use in a fracture stimulation treatment of the well or a concentrate to which additional fluid is added prior to use in a fracture stimulation of the well. In other instances, the fracturing fluid producing apparatus can be omitted and the fracturing fluid sourced directly from the fluid source. In certain instances, the fracturing fluid may comprise water, a hydrocarbon fluid, a polymer gel, foam, air, wet gases and/or other fluids.

In certain embodiments of the present disclosure, a pump and blender system receives a hydrated fracturing fluid and combines it with other components, including proppant and/or additional additives (e.g., one or more surfactants selected in accordance with the methods of the present disclosure). The resulting mixture may be pumped down the well under a pressure sufficient to create or enhance one or more fractures in a subterranean zone, for example, to stimulate production of fluids from the zone. Notably, in certain instances, the fracturing fluid producing apparatus, fluid source, proppant source, and/or additive source may be equipped with one or more metering devices to control the flow of fluids, proppants, and/or other additives to the pumping and blender system and/or to control the concentrations of additives and proppants in the resulting fracturing fluid pumped downhole.

While not specifically illustrated herein, the disclosed methods may also directly or indirectly affect any transport or delivery equipment used to convey the compositions to the fracturing system such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Although the methods of the present disclosure may be described or claimed in a particular sequential order, such steps may be performed in different orders to select a surfactant for treating a subterranean formation. Any sequence or order that may be explicitly described or claimed does not necessarily indicate a requirement that the steps be performed in that order. It should be understood that the steps of the methods described herein may be performed in any order, separated or combined and will still benefit from the embodiments of the present disclosure. The methods of the present disclosure may also be used in conjunction with other surfactant selection methods to select one or more surfactants suited for a particular subterranean formation.

An embodiment of the present disclosure is a method comprising: (a) providing a treatment fluid, formation materials, hydrocarbon, and a plurality of surfactants, wherein the hydrocarbon is acquired from a subterranean formation; (b) selecting at least two surfactants from the plurality of surfactants, said selecting comprising: forming at least two mixtures, wherein each mixture comprises the treatment fluid, the hydrocarbon, and at least one of the plurality of surfactants; determining at least one of percent separation and separation time for each mixture; and selecting at least two surfactants from the plurality of surfactants based on at least one of the percent separation and the separation time; (c) selecting at least one surfactant from the surfactants selected in step (b), said selecting comprising: adding the treatment fluid, the formation materials, the hydrocarbon, and at least one surfactant selected in step (b) to at least two vessels; allowing the hydrocarbon to flow through the formation materials; determining at least one of the volume of treatment fluid displaced from the formation materials and the time for the hydrocarbon to flow through the formation materials for each vessel; and selecting at least one surfactant from the surfactants selected in step (b) based on at least one of the volume of the treatment fluid displaced from the formation materials and the time for the hydrocarbon to flow through the formation materials; and (d) selecting at least one concentration of the surfactant selected in step (c), said selecting comprising: adding the treatment fluid, the formation materials, the hydrocarbon, and at least one concentration of the surfactant selected in step (c) to at least one vessel; allowing the hydrocarbon to flow through the formation materials; determining at least one of the volume of treatment fluid displaced from the formation materials and the time for the hydrocarbon to flow through the formation materials for the vessel; and selecting at least one concentration of the surfactants selected in step (c) based on at least one of the volume of the treatment fluid displaced from the formation materials and the time for the hydrocarbon to flow through the formation materials.

Another embodiment of the present disclosure is a method comprising: (a) providing a treatment fluid, formation materials, hydrocarbon, and a surfactant, wherein the hydrocarbon is acquired from a subterranean formation; (b) selecting at least two concentrations of the surfactant, said selecting comprising: forming at least two mixtures, wherein each mixture comprises the treatment fluid, the hydrocarbon, and at least one concentration of the surfactant; determining at least one of percent separation and separation time for each mixture; and selecting at least two concentrations of the surfactant based on at least one of the percent separation and the separation time; and (c) selecting at least one concentration of the surfactant from the concentrations selected in step (b), said selecting comprising: adding the treatment fluid, the formation materials, the hydrocarbon, and the surfactant at at least one concentration selected in step (b) to at least two vessels; allowing the hydrocarbon to flow through the formation materials; determining at least one of the volume of treatment fluid displaced from the formation materials and the time for the hydrocarbon to flow through the formation materials for each vessel; and selecting at least one concentration of the surfactant based on at least one of the volume of the treatment fluid displaced from the formation materials and the time for the hydrocarbon to flow through the formation materials.

Another embodiment of the present disclosure is a method comprising: (a) providing a treatment fluid, formation materials, hydrocarbon, and a plurality of surfactants, wherein the hydrocarbon is acquired from a subterranean formation; (b) selecting at least two surfactants from the plurality of surfactants, said selecting comprising: forming at least two mixtures, wherein each mixture comprises the treatment fluid, the hydrocarbon, and at least one of the plurality of surfactants; determining at least one of percent separation and separation time for each mixture; and selecting at least two surfactants from the plurality of surfactants based on at least one of the percent separation and the separation time; and (c) selecting at least one surfactant from the surfactants selected in step (b), said selecting comprising: adding the treatment fluid, the formation materials, the hydrocarbon, and at least one surfactant selected in step (b) to at least two vessels; allowing the hydrocarbon to flow through the formation materials; determining at least one of the volume of treatment fluid displaced from the formation materials and the time for the hydrocarbon to flow through the formation materials for each vessel; and selecting at least one surfactant from the surfactants selected in step (b) based on at least one of the volume of the treatment fluid displaced from the formation materials and the time for the hydrocarbon to flow through the formation materials.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

Figure 4:
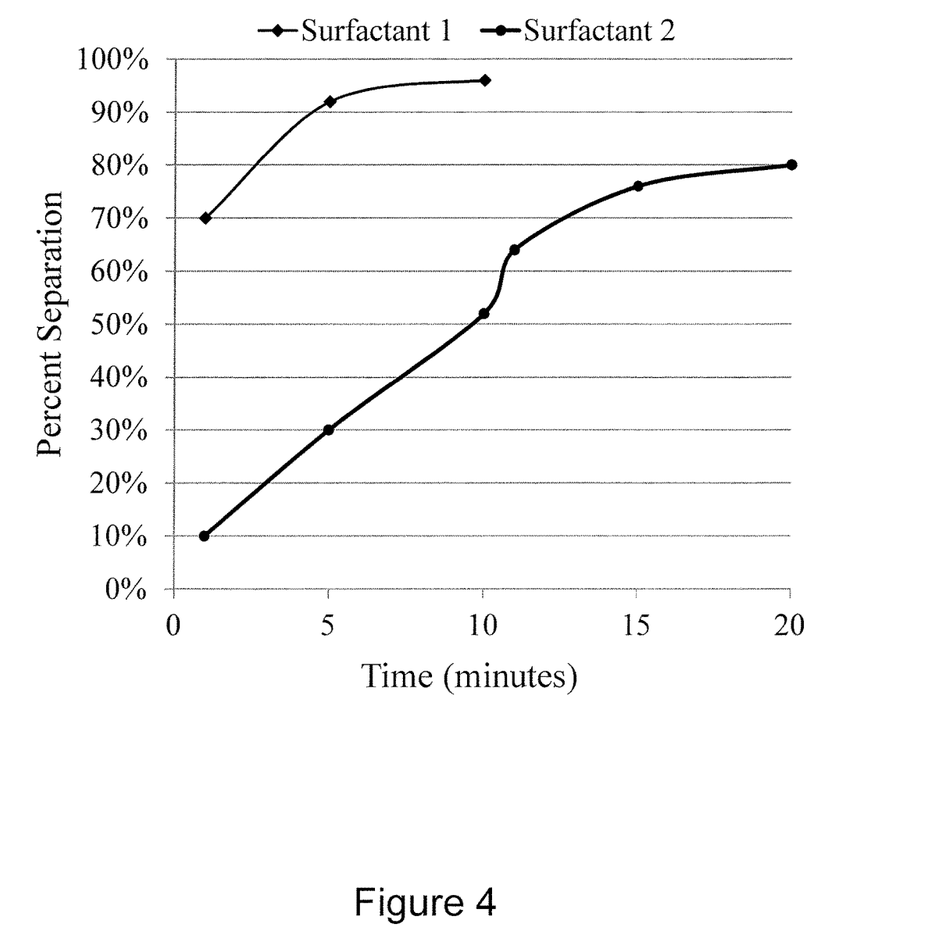
FIG. 4 is a graph representing percent separation as compared to time for two emulsions, each containing different surfactants, according to one embodiment of the present disclosure.

Broken fracturing fluid and hydrocarbon were mixed in a 50:50 ratio at room temperature to form two emulsions. A different surfactant was added to each emulsion. The mixtures were allowed to separate at room temperature, and percent separation and separation time were determined for each emulsion over 10 minutes. The mixtures were then heated with a water bath to 180° F., and percent separation and separation time were determined for each emulsion over 10 minutes. FIG. 4 shows percent separation compared to time for the emulsions. Surfactant 1 achieved 100% separation after 10 minutes at room temperature while Surfactant 2 achieved only around 52% separation in the same amount of time. Surfactant 2 achieved 80% separation after heating an additional 10 minutes. Thus, using one embodiment of the present disclosure, Surfactant 1 may be selected, and Surfactant 2 may not be selected.

Example 2

Figure 5:
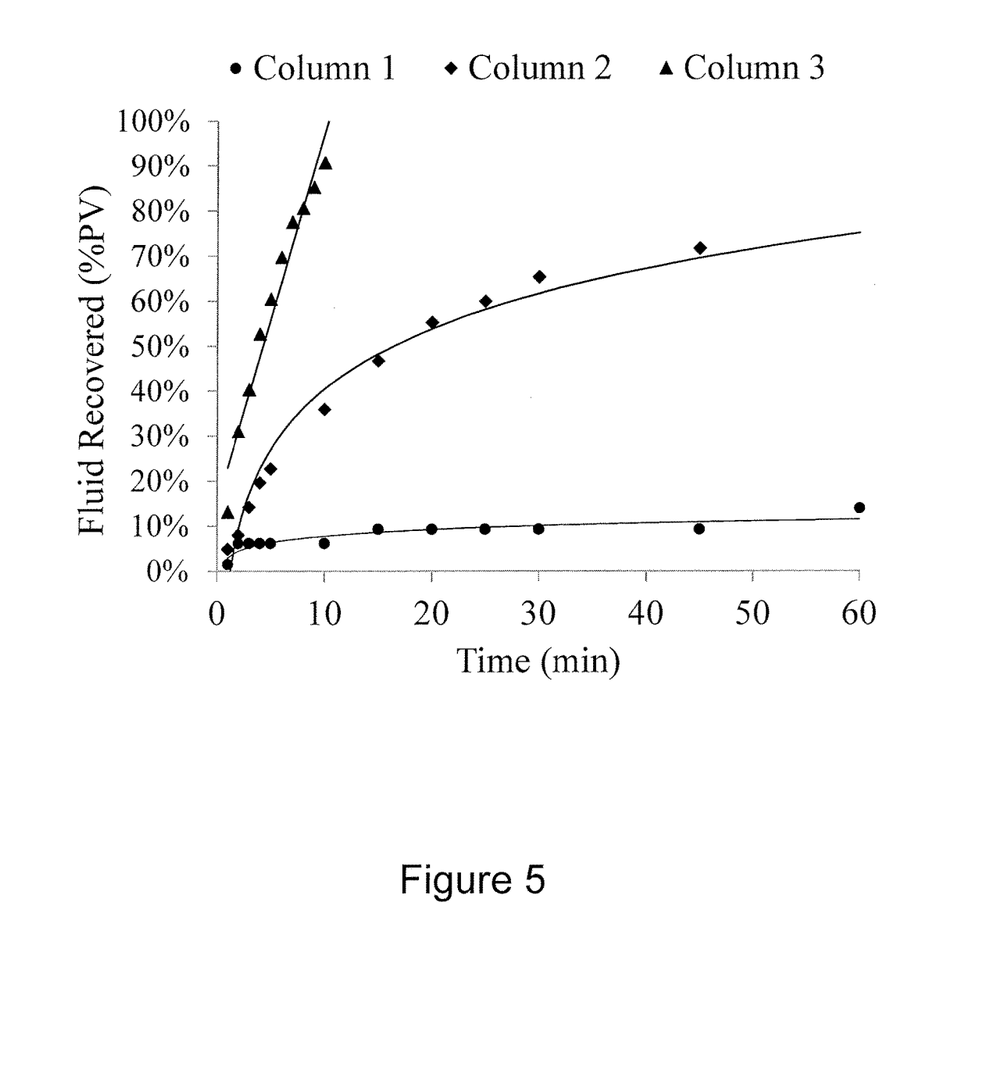
FIG. 5 is a graph representing volume of treatment fluid displaced by hydrocarbon flowing through formation materials as compared to time, according to one embodiment of the present disclosure.

Formation cuttings and proppant were mixed to form a sand bed and then treated with a treatment fluid made from formation water, fracturing fluid, and fracturing fluid additives in three separate columns. Two different surfactants were added to the treatment fluids used to treat the sand beds in Column 2 and Column 3. Column 1 remained a non-treated control column. Hydrocarbon was added to each column and allowed to flow through the sand beds. FIG. 5 shows the volume of treatment fluid displaced by hydrocarbon flowing through formation materials as compared to time for each column. About 91% of treatment fluid was displaced from Column 3 after 10 minutes while only about 36% of treatment fluid was displaced from Column 2 and only about 6% of treatment fluid was displaced from Column 1 in the same amount of time. Thus, using one embodiment of the present disclosure, Surfactant 2, used in Column 3, may be selected, and Surfactant 1, used in Column 2, may not be selected. Example 2 demonstrates the ability of a surfactant to enhance the recovery of hydrocarbon and treatment fluid from formation materials and the selected surfactant having a better performance in fluid recovery as compared to the other surfactants.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
(a) providing a treatment fluid, formation materials, hydrocarbon, and a plurality of surfactants, wherein the hydrocarbon is acquired from a subterranean formation;
(b) selecting a first subset from the plurality of surfactants, wherein the first subset comprises at least two surfactants, said selecting comprising:
forming at least two mixtures, wherein each mixture comprises the treatment fluid, the hydrocarbon, and at least one of the plurality of surfactants;
determining at least one of percent separation and separation time for each mixture; and
selecting the first subset from the plurality of surfactants based on at least one of the percent separation and the separation time, wherein for each surfactant in the first subset: (i) the percent separation is greater than the percent separation of at least one other surfactant in the plurality of surfactants, or (ii) the separation time is greater than the separation time of at least one other surfactant in the plurality of surfactants;
(c) selecting a second subset from the first subset selected in step (b), said selecting comprising:
preparing at least two vessels, wherein each vessel comprises the treatment fluid, the formation materials, the hydrocarbon, and at least one surfactant from the first subset;
allowing the hydrocarbon to flow through the formation materials;
determining at least one of the volume of the treatment fluid displaced from the formation materials and the time for the hydrocarbon to flow through the formation materials for each vessel; and
selecting the second subset from the first subset based on at least one of the volume of the treatment fluid displaced from the formation materials by the hydrocarbon and the time for the hydrocarbon to flow through the formation materials, wherein for each surfactant in the second subset: (i) the volume of the treatment fluid displaced from the formation materials by the hydrocarbon is greater than the volume of the treatment fluid displaced from the formation materials by the hydrocarbon for at least one other surfactant in the first subset, or (ii) the time for the hydrocarbon to flow through the formation materials is less than the time for the hydrocarbon to flow through the formation materials for at least one other surfactant in the first subset; and
(d) selecting a selected concentration of a surfactant from the second subset selected in step (c), said selecting comprising:
preparing at least two vessels, wherein each vessel comprises the treatment fluid, the formation materials, the hydrocarbon, and a tested concentration of at least one surfactant in the second subset;

allowing the hydrocarbon to flow through the formation materials;
determining at least one of the volume of the treatment fluid displaced from the formation materials by the hydrocarbon and the time for the hydrocarbon to flow through the formation materials for the vessel; and
selecting the selected concentration from a plurality of the tested concentrations in the at least two vessels based on at least one of the volume of the treatment fluid displaced from the formation materials by the hydrocarbon and the time for the hydrocarbon to flow through the formation materials, wherein for the selected concentration: (i) the volume of the treatment fluid displaced from the formation materials by the hydrocarbon is greater than the volume of the treatment fluid displaced from the formation materials by the hydrocarbon for at least one other tested concentration, or (ii) the time for the hydrocarbon to flow through the formation materials is less than the time for the hydrocarbon to flow through the formation materials for at least one tested concentration.

2. The method of claim 1 further comprising determining the compatibility of the treatment fluid with at least one surfactant from the plurality of surfactants, wherein determining the compatibility comprises:
combining the at least one of the surfactants from the plurality of surfactants and the treatment fluid to form at least one mixture; and
determining whether a precipitate forms in the mixture or whether the at least one surfactant changes the viscosity of the treatment fluid.

3. The method of claim 1 further comprising introducing a well treatment fluid comprising a base fluid and the selected concentration into a subterranean formation.

4. A method comprising:
(a) providing a treatment fluid, formation materials, hydrocarbon, and a surfactant, wherein the hydrocarbon is acquired from a subterranean formation;
(b) selecting a first subset from a plurality of concentrations of the surfactant, wherein the first subset comprises at least two concentrations, said selecting comprising:
forming at least two mixtures, wherein each mixture comprises the treatment fluid, the hydrocarbon, and at least one concentration of the surfactant;
determining at least one of percent separation and separation time for each mixture; and
selecting the first subset from the plurality of concentrations based on at least one of the percent separation and the separation time, wherein for each concentration in the first subset: (i) the percent separation is greater than the percent separation of at least one other concentration in the plurality of concentrations, or (ii) the separation time is greater than the separation time of at least one other concentration in the plurality of concentrations; and
(c) selecting a second subset from the first subset selected in step (b), said selecting comprising:
preparing at least two vessels, wherein each vessel comprises the treatment fluid, the formation materials, the hydrocarbon, and a concentration from the second subset;
allowing the hydrocarbon to flow through the formation materials;
determining at least one of the volume of the treatment fluid displaced from the formation materials by the hydrocarbon and the time for the hydrocarbon to flow through the formation materials for each vessel; and
selecting a second subset from the first subset based on at least one of the volume of the treatment fluid displaced from the formation materials by the hydrocarbon and the time for the hydrocarbon to flow through the formation materials, wherein for each concentration in the second subset: (i) the volume of the treatment fluid displaced from the formation materials by the hydrocarbon is greater than the volume of the treatment fluid displaced from the formation materials by the hydrocarbon for at least one other concentration in the first subset, or (ii) the time for the hydrocarbon to flow through the formation materials is less than the time for the hydrocarbon to flow through the formation materials for at least one other concentration in the first subset.

5. The method of claim 4 further comprising determining the compatibility of the treatment fluid with the surfactant, wherein determining the compatibility comprises:
combining the surfactant at at least one concentration from the second subset and the treatment fluid to form at least one mixture; and
determining whether a precipitate forms in the mixture or whether the surfactant at the at least one concentration from the second subset changes the viscosity of the treatment fluid.

6. The method of claim 4 further comprising introducing a well treatment fluid comprising a base fluid and the surfactant at at least one concentration from the second subset into a subterranean formation.

7. A method comprising:
(a) providing a treatment fluid, formation materials, hydrocarbon, and a plurality of surfactants, wherein the hydrocarbon is acquired from a subterranean formation;
(b) selecting a first subset from the plurality of surfactants, wherein the first subset comprises at least two surfactants, said selecting comprising:
forming at least two mixtures, wherein each mixture comprises the treatment fluid, the hydrocarbon, and at least one of the plurality of surfactants;
determining at least one of percent separation and separation time for each mixture; and
selecting the first subset from the plurality of surfactants based on at least one of the percent separation and the separation time, wherein for each surfactant in the first subset: (i) the percent separation is greater than the percent separation of at least one other surfactant in the plurality of surfactants, or (ii) the separation time is greater than the separation time of at least one other surfactant in the plurality of surfactants; and
(c) selecting a second subset from the first subset selected in step (b), said selecting comprising:
preparing at least two vessels, wherein each vessel comprises the treatment fluid, the formation materials, the hydrocarbon, and at least one surfactant from the first subset;
allowing the hydrocarbon to flow through the formation materials;
determining at least one of the volume of the treatment fluid displaced from the formation materials by the hydrocarbon and the time for the hydrocarbon to flow through the formation materials for each vessel; and selecting the second subset from the first subset based on at least one of the volume of the treatment fluid displaced from the formation materials by the hydrocarbon and the time for the hydrocarbon to flow through the formation materials, wherein for each surfactant in the second subset: (i) the volume of the treatment fluid displaced from the formation materials by the hydrocarbon is greater than the volume of the treatment fluid displaced from the formation materials by the hydrocarbon for at least one other surfactant in the first subset, or (ii) the time for the hydrocarbon to flow through the formation materials is less than the time for the hydrocarbon to flow through the formation materials for at least one other surfactant in the first subset.

8. The method of claim 7 further comprising:
(d) selecting a selected concentration of a surfactant from the second subset selected in step (c), said selecting comprising:
  preparing at least two vessels, wherein each vessel comprises the treatment fluid, the formation materials, the hydrocarbon, and a tested concentration of at least one surfactant in the second subset;
  allowing the hydrocarbon to flow through the formation materials;
  determining at least one of the volume of the treatment fluid displaced from the formation materials by the hydrocarbon and the time for the hydrocarbon to flow through the formation materials for the vessel; and
  selecting the selected concentration from a plurality of the tested concentrations in the at least two vessels based on at least one of the volume of the treatment fluid displaced from the formation materials by the hydrocarbon and the time for the hydrocarbon to flow through the formation materials, wherein for the selected concentration: (i) the volume of the treatment fluid displaced from the formation materials by the hydrocarbon is greater than the volume of the treatment fluid displaced from the formation materials by the hydrocarbon for at least one other tested concentration, or (ii) the time for the hydrocarbon to flow through the formation materials is less than the time for the hydrocarbon to flow through the formation materials for at least one tested concentration.

9. The method of claim 7 further comprising determining the compatibility of the treatment fluid with at least one surfactant from the plurality of surfactants.

10. The method of claim 9 wherein determining the compatibility comprises combining the at least one surfactant from the plurality of surfactants and the treatment fluid to form at least one mixture and determining whether a precipitate forms in the mixture.

11. The method of claim 9 wherein determining the compatibility comprises determining whether the at least one surfactant changes the viscosity of the treatment fluid.

12. The method of claim 7 further comprising heating the mixtures to about the bottom hole temperature of a subterranean formation before determining at least one of the percent separation and the separation time for the mixtures.

13. The method of claim 7 wherein the formation materials are acquired from the subterranean formation.

14. The method of claim 7 wherein the percent separation is determined within 20 minutes of forming the mixtures.

15. The method of claim 7 further comprising introducing a well treatment fluid comprising a base fluid and at least one surfactant selected in step (c) into a subterranean formation.

16. The method of claim 15 wherein the well treatment fluid is introduced into the subterranean formation using one or more pumps.

17. The method of claim 15 wherein the well treatment fluid is introduced at or above a pressure sufficient to create or enhance at least one fracture in the subterranean formation.

18. The method of claim 7 wherein the method is performed at a field lab or at a production well site.

19. The method of claim 7 wherein the mixtures are emulsions.

20. The method of claim 7 wherein the treatment fluid is a broken treatment fluid.

* * * * *